United States Patent [19]
McLaughlin

[11] Patent Number: 6,138,049
[45] Date of Patent: Oct. 24, 2000

[54] SYSTEM AND METHODS FOR GENERATING AND DISTRIBUTING ALARM AND EVENT NOTIFICATIONS

[75] Inventor: Paul F. McLaughlin, Hatfield, Pa.

[73] Assignee: Honeywell International Inc., Morristown, N.J.

[21] Appl. No.: 08/916,871

[22] Filed: Aug. 22, 1997

[51] Int. Cl.$^7$ .............................. G05B 11/32; G05B 15/02
[52] U.S. Cl. .................................................. 700/67
[58] Field of Search ........................... 364/138, 528.11, 364/130; 395/185.01, 185.02; 714/56, 43, 14, 20, 3, 13; 700/67, 9

[56] References Cited

U.S. PATENT DOCUMENTS

| | | | |
|---|---|---|---|
| 4,500,985 | 2/1985 | Chang | 370/244 |
| 4,536,874 | 8/1985 | Stoffel et al. | 370/453 |
| 4,926,375 | 5/1990 | Mercer et al. | 395/200.31 |
| 5,351,184 | 9/1994 | Lu et al. | 364/165 |
| 5,499,188 | 3/1996 | Kline, Jr. et al. | 364/138 |
| 5,561,599 | 10/1996 | Lu | 364/164 |
| 5,572,420 | 11/1996 | Lu | 364/153 |
| 5,574,638 | 11/1996 | Lu | 364/165 |
| 5,720,035 | 2/1998 | Allegre et al. | 395/200.55 |
| 5,778,188 | 7/1998 | Taniguchi et al. | 709/236 |
| 5,796,606 | 8/1998 | Spring | 364/138 |
| 5,805,578 | 9/1998 | Kline, Jr. et al. | 370/255 |

FOREIGN PATENT DOCUMENTS

| | | |
|---|---|---|
| 0 333 228 | 8/1981 | European Pat. Off. . |
| 0 562 333 | 9/1993 | European Pat. Off. . |
| 0 754 991 | 1/1997 | European Pat. Off. . |
| 2 268 308 | 11/1975 | France . |
| 2 727 269 | 5/1996 | France . |

*Primary Examiner*—Albert De Cady
*Assistant Examiner*—Shelly A Chase
*Attorney, Agent, or Firm*—William A. Munck; Anthony Miologos

[57] ABSTRACT

The present invention provides systems and methods for controlling associated processes of a process facility and, in particular, for distributing data among various nodes of a real time process control system that controls such a facility. An exemplary process control system includes a plurality of sensors, controllable devices, and communication paths, as well as a computer system. The sensors and controllable devices are associated with various ones of the processes of the process facility, and the communication paths associate the sensors and controllable devices with the computer system. The computer system operates on data relating to the process facility, and distributes the data among the nodes thereof. The nodes are associated by the communication paths, and the computer system further includes notification controllers. The notification controllers are associated with the nodes, and operate to sense reestablishment of lost ones of the communications paths from first distributed nodes to second distributed nodes and, in response thereto, communicate notification data from the second distributed nodes to the first distributed nodes.

21 Claims, 4 Drawing Sheets

SYSTEM AND METHODS FOR GENERATING AND DISTRIBUTING ALARM AND EVENT NOTIFICATIONS

CROSS-REFERENCE TO RELATED APPLICATIONS

The present invention is related to that disclosed in (1) U.S. patent application Ser. No. 08/916,870, entitled "Systems and Methods for Implementing a Dynamic Cache in a Supervisory Control System," which was filed on Aug. 22, 1997, and (2) U.S. patent application Ser. No. 08/920,265, entitled "Systems and Methods for Accessing Data Using Cyclic Publish/Subscribe Scheme with Report By Exception," which was filed on Aug. 22, 1997. These related patent documents are commonly assigned to the Assignee of the present invention and were filed concurrently herewith. The disclosures of these related patent applications are incorporated herein by reference for all purposes as if fully set forth herein.

TECHNICAL FIELD OF THE INVENTION

The present invention is directed, in general, process control systems and, more specifically, to a process control system using an alarm and event detection and notification system.

BACKGROUND OF THE INVENTION

Many process facilities (e.g., a manufacturing plant, a mineral or crude oil refinery, etc.) are managed using distributed control systems. Typical contemporary control systems include numerous modules tailored to monitor and/or control various processes of the facility. Conventional means link these modules together to produce the distributed nature of the control system. This affords increased performance and a capability to expand or reduce the control system to satisfy changing facility needs.

Process facility management providers, such as Honeywell, Inc., develop control systems that can be tailored to satisfy wide ranges of process requirements (e.g., global, local or otherwise) and facility types (e.g., manufacturing, warehousing, refining, etc.). Such providers have two principal objectives. The first objective is to centralize control of as many processes as possible to improve an overall efficiency of the facility. The second objective is to support a common interface that communicates data among various modules controlling or monitoring the processes, and also with any such centralized controller or operator center.

Each process, or group of associated processes, has one or more input characteristics (e.g., flow, feed, power, etc.) and one or more output characteristics (e.g., temperature, pressure, etc.) associated with it. Model predictive control ("MPC") techniques have been used to optimize certain processes as a function of such characteristics. One MPC technique uses algorithmic representations of certain processes to estimate characteristic values (represented as parameters, variables, etc.) associated with them that can be used to better control such processes. In recent years, physical, economic and other factors have been incorporated into control systems for these associated processes.

Examples of such techniques are described in U.S. Pat. No. 5,351,184 entitled "Method of Multivariable Predictive Control Utilizing Range Control;" U.S. Pat. No. 5,561,599 entitled "Method of Incorporating Independent Feedforward Control in a Multivariable Predictive Controller;" U.S. Pat. No. 5,572,420 entitled "Method of Optimal Controller Design of Multivariable Predictive Control Utilizing Range Control;" and U.S. Pat. No. 5,574,638 entitled "Method of Optimal Scaling of Variables in a Multivariable Predictive Controller Utilizing Range Control," all of which are commonly owned by the assignee of the present invention and incorporated herein by reference for all purposes (the foregoing issued patents and U.S. patent application Ser. Nos. 08/916,870 and 08/920,265, previously incorporated herein by reference, are collectively referred to hereafter as the "Honeywell Patents and Application").

The distributed control systems used to monitor and control a process are frequently linked by common communication pathways, such as by a local area network (LAN) architecture or by a wide area network (WAN) architecture. When a requesting node needs a datum from a responding node, it issues a request for the datum across the network and the responding node then returns the datum back across the network. Many process control systems use a supervisory control LAN or WAN integrated with one or more process control networks. The process control networks contain the basic raw data required by the supervisory control network and other process control networks.

An important function in distributed control systems is the generation and distribution of notifications, also known as events. A notification is an indication of some abnormal or exceptional situation relating to a controlled process or its measurement and control equipment. A process controller generates notifications that are distributed to a notification client, which is an end-point application that requires the notifications. For example, notifications may comprise alarms, system events, operator messages, and the like, that are related to user-visible process, equipment and hardware exceptions.

For example, a first process controller that requires process data is a notification client with respect to a second process controller that contains that process data. In the case of any abnormality, such as a communication loss by the second process controller, the second process controller may be required to generate notifications when the abnormality is removed. Typically, the first process controller becomes aware that the second process controller has recovered and requests a notification recovery from the second process controller. The second process controller then regenerates all notifications that may have occurred during the communications failure and transmits them to the first process controller. This type of notification distribution system has drawbacks, however. The system is dependent upon the notification client (i.e., the first process controller) requesting the notification recovery. This may not occur for some time after the abnormality has ended and the second process controller has recovered. Additionally, the process controller that is generating the notifications may have many notification clients. If each notification client separately requests and receives a notification recovery from the notification generating process controller, a large amount of network traffic is generated, thereby reducing overall system capacity.

There is therefore a need in the art for improved process control systems capable of generating and distributing notifications immediately upon recovery of a process controller, without the need for a notification recovery request by a notification client. There is a further need for improved process control systems capable of distributing notifications rapidly from one network node to a plurality of notification clients.

SUMMARY OF THE INVENTION

To address the above-discussed deficiencies of the prior art, it is a primary object of the present invention to provide a high-performance notification distribution and recovery scheme that is reliable, deterministic, and flexible. As introduced hereinabove, a typical process facility includes many associated processes, various ones of which are associated with different stages of the overall process (e.g., natural resource refining, filtration, gas/oil separation, fabrication and other like processes). The present invention introduces systems and methods that optimize distribution of notification data and synchronizing notification clients and notification producers using notification recovery techniques that are seamlessly handled by the communication application layer.

In the attainment of this primary object, the present invention provides systems and methods for controlling associated processes within process facilities and, in particular, for efficiently distributing notification data among nodes of a real time process control system controlling a given facility. An exemplary process control system includes sensors, controllable devices, communication paths, a computer system, and notification controllers. The sensors and controllable devices are associated with various ones of the processes of the facility, and the communication paths associate the sensors and controllable devices with the computer system. The computer system operates on data relating to the process facility, and distributes the notification data among select nodes thereof. The nodes are associated by the communication paths, and the computer system further includes notification controllers. The notification controllers are associated with the nodes, and operate to sense reestablishment of new or lost ones of the communications paths from first distributed nodes to second distributed nodes and, in response thereto, communicate notification data from the second distributed nodes to the first distributed nodes.

According to an advantageous embodiment, such notification data includes alarm or event data, and the distribution relationship among the second to first node may suitably exist as any of a 1:n, n:1, or n:m relationships. These relationships represent, abstractly, logical communication connections among application and transport layer services as provided by the systems and methods of the present invention. More particularly, notification recovery is a function, whether based in hardware, software, firmware, or otherwise, whereby notifications are regenerated by a notification producer (the second nodes of the exemplary system introduced above) for a notification consumer (the first nodes thereof) in response to communication, equipment or other failure/abnormality and subsequent recovery (such as the reestablishment of the lost ones of the communications paths from the first to the second distributed nodes therein).

The principles of the present invention provide, particularly through notification controllers, a suitable means for efficiently utilizing the inherent physical limitations of the various components of the process control system, and the process control system as a whole, particularly the data traffic capacities of the communications paths. Automatic communication of notification data from a process node (a node that controls a process) to a client node (a server or other consumer node that consumes notification data) in response to sensing reestablishment of a lost communications path from the client to the process node according to the present invention suitably eliminates requests, "pollings," and the like from client to process nodes for such notification data thereby reducing utilization of data traffic capacities of the communication paths among the nodes of the control system.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, where like numbers designate like objects, and in which.

DETAILED DESCRIPTION

Figure 1:
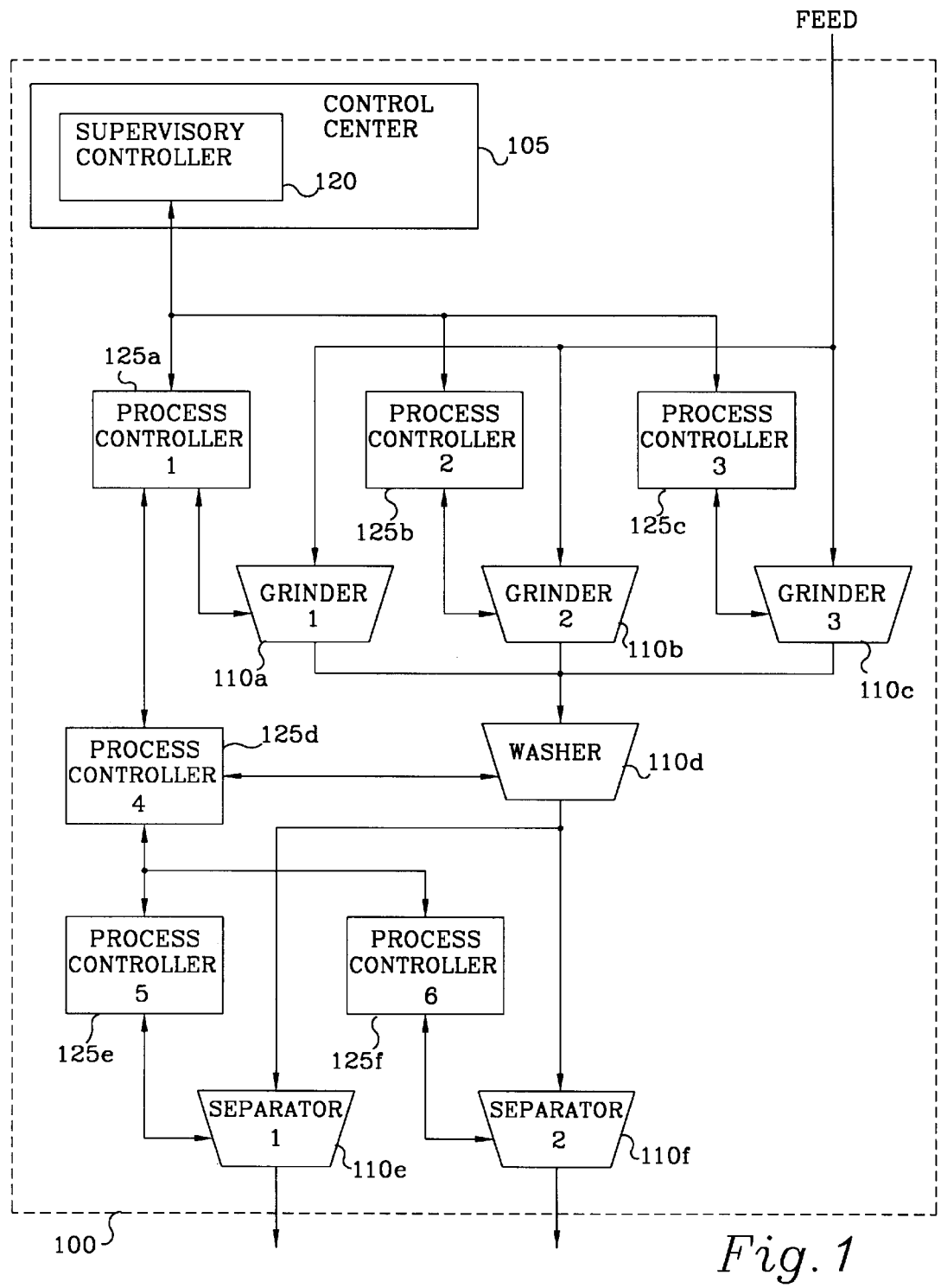
FIG. 1 illustrates a simple block diagram of a process facility in which a control system according to the principles of the present invention may be implemented.
Figure 2:
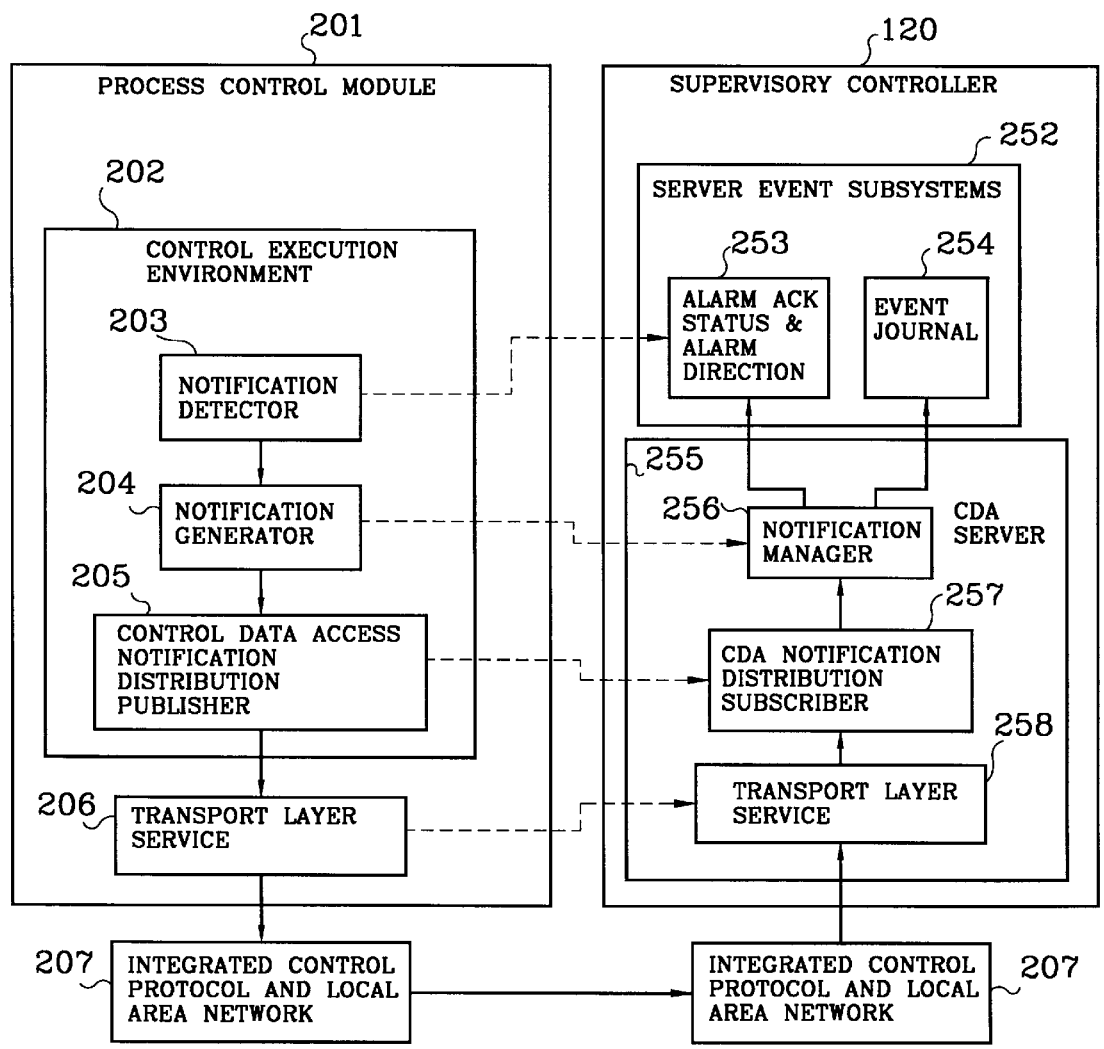
FIG. 2 illustrates a block diagram depicting the notifications distribution relationship between a process control module and a supervisory controller according to one embodiment of the present invention.

FIGS. 1–3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged process facility.

FIG. 1 illustrates a block diagram of a process facility 100 in which a control system according to the principles of the present invention may be implemented. Exemplary process facility 100 processes raw materials, and includes a control center 105 and six associated processes, items 110a–110f, arranged in three stages. The term "include," as used herein, means inclusion without limitation. Exemplary control center 105 may comprise a central area that is commonly manned by an operator (not shown) for monitoring and controlling the three exemplary process stages. A first process stage includes three raw material grinders 110a–110c that receive a "feed" of raw material and grind the same, such as by using a pulverizer or a grinding wheel, into smaller particles of raw material. The second process stage includes a washer 110d that receives the ground raw materials and cleans the same to remove residue from the first stage. The third process stage includes a pair of separators 110e and 110f that receive the ground, washed raw materials and separate the same into desired minerals and any remaining raw materials. Since this process facility is provided for purposes of illustration only and the principles of such a facility are well known, further discussion of the same is beyond the scope of this patent document and unnecessary.

The exemplary control system includes a supervisory controller 120 and six process nodes, or process controllers 125a–125f, each of which is implemented in software and executable by a suitable conventional computing system (standalone or network), such as any of Honeywell, Inc.'s AM K2LCN, AM K4LCN, AM HMPU, AxM or like systems. Those skilled in the art will understand that such controllers may be implemented in hardware, software, or firmware, or some suitable combination of the same. In general, the use of computing systems in control systems for process facilities is well known.

Supervisory controller 120 is associated with each of process controllers 125, directly or indirectly, to allow the exchange of information. The phrase "associated with" and derivatives thereof, as used herein, may mean to include within, interconnect with, contain, be contained within, connect to or with, couple to or with, be communicable with, cooperate with, interleave, be a property of, be bound to or with, have, have a property of, or the like. Supervisory controller 120 monitors characteristics (e.g., status, temperature, pressure, flow rate, current, voltage, power, utilization, efficiency, cost and other economic factors, etc.) of associated processes 110, either directly or indirectly through process controllers 125 associated with processes 110. Depending upon the specific implementation, such monitoring may be of an individual process, a group of processes, or the whole facility.

Supervisory controller 120 communicates with associated processes 110 via process controllers 125 and generates supervisory data in order to optimize process facility 100. The phrase "supervisory data," as used herein, is defined as any numeric, qualitative or other value generated by supervisory controller 120 to control (e.g., direct, manage, modify, recommend to, regulate, suggest to, supervise, cooperate, etc.), for example, a particular process, a group of processes, the whole facility, a process stage, a group of stages, a sequence of processes or stages, or the like, to optimize the facility as a whole. In a preferred embodiment, the supervisory data is dynamically generated and is based at least upon a given facility's efficiency, production or economic cost, and most preferably all three.

Process controllers 125 monitor associated processes 110 and operate to varying degrees in accordance with the supervisory data to control the associated processes, and, more particularly, to modify one or more processes and improve the monitored characteristics and the facility as a whole. The relationship between supervisory controller 120 and various ones of process controllers 125 may be master-slave (full compliance), cooperative (varying compliance, such as by using the supervisory data as a factor in controlling the associated processes), or complete disregard (noncompliance). Depending upon the specific implementation and the needs of a given facility, the relationship between supervisory controller 120 and a specific process controller 125 may be static (i.e., always only one of compliance, cooperative, or noncompliance), dynamic (i.e., varying over time, such as within a range between compliance and noncompliance, or some lesser range in between), or switching between static periods and dynamic periods.

FIG. 1 depicts the process controllers 125a–f as simple logical blocks coupled to the processes 110a–f for purposes of illustration only. In reality, the process controllers 125a–f may be implemented in process facility 100 as any of a wide range of devices. In the simplest embodiments, an exemplary process controller 125 may be micro-controller circuit fabricated on a circuit board and integrated into one of the processes 110 (i.e, part of a separator, washer, or grinder) that is being controlled. In other embodiments, an exemplary process controller 125 may be a stand-alone computer, such as a personal computer (PC), that is remote from the controlled process 110 and coupled to it by a bus architecture.

In more complex embodiments, an exemplary process controller 125 may be a network node coupled to one or more process(es) 110 by a network architecture. The supervisory controller 120 may then treat the network containing the exemplary process controller 125 and its associated processes 110 as a single functional group. Finally, an exemplary process controller 125 may be a group of process controllers and their associated processes 110 that are networked together. The networked group may then be treated as a single functional group by supervisory controller 120.

The process controllers 125a–f produce process data that is used by the supervisory controller 120 for a variety of purposes, including generating the supervisory data and distributing the process data to one or more client applications. Process data may also be used by the process controller 125 that produced it to control the associated process 110. For example, a process controller 125 may read physical parameter data from a process 110, such as temperature, pressure, flow rate, and the like, and use some or all of that process data and, perhaps, some supervisory data to control the process 110. This is particularly true in a feedback-controlled process.

Process data may be transferred directly between process controllers 125–f in a peer-to-peer relationship, as in a LAN network. For example, process controller 4, which controls the washer (item 110d), may request process data from process controllers 1–3, which control grinders 1–3, in order to determine the rate at which ground raw material is being output from grinders 1–3. The washer may thereby adjust the rate at which it washes the ground material. For example, the washer may reduce the amount of power that it uses to wash the ground raw material when the amount of ground raw material being sent to the washer is relatively low. It may even temporarily shut down in order to "hold and wait" for a suitable amount of ground raw material to accumulate before it resumes washing.

In some embodiments of the present invention, the supervisory controller 120 may comprise a LAN, a group of connected LANS, or a WAN architecture. One or more client applications are executed on nodes of the LAN/WAN architecture. The nodes may be, for example, personal computers (PCs). The client applications may all require the same process data and supervisory to be transferred at the same update rate from the process controllers. However, a more likely scenario is that the client applications require different, possibly over-lapping, subsets of the process data and supervisory data and require the process data and supervisory data to be transferred at different update rates to different client applications.

FIG. 2 illustrates a block diagram depicting the notifications distribution relationship between a process control module 201 and supervisory controller 120 according to one embodiment of the present invention. Process control module 201 represents the processing and network interface circuitry of an exemplary one of the process controllers 125 in FIG. 1. In FIG. 2, the solid arrows indicates a physical data path and notification direction and the dotted arrows indicate a logical data path and notification direction.

Notification recovery is initiated in notification manager 256 upon the occurrence of any one of the following system operations: server startup, server failover, controller startup, controller failover, control network communication failure and recovery and addition (via configuration) of a new process controller. In the exemplary embodiment, supervisory controller 120 is the server with respect to PCM 201 and the two are coupled by a local area network architecture.

Notification recovery is needed in those situations in which notification clients and notification producers become unsynchronized, usually due to some system or equipment fault (e.g., controller, network, workstation, etc.) and the repair thereof.

In on advantageous embodiment of the present invention, notification recovery is carried out entirely by the communication application layer that serves the client application(s) using the notifications. It is the application layer in the notification client node (the "notification subscriber") that commands a notification recovery. The application layer does notification recovery on behalf of a notification client when the notification client needs it, so that neither the notification client application nor the function layer of the notification producer are burdened by this function.

Notification generators exist in PCM 201 as user-configured functional blocks that are managed by a control execution environment (CEE) 202. The CEE 202 may receive (when needed) a notification recovery command from the notification manager 256 in supervisory controller 120 and, in turn, commands each functional block to generate all notifications. The notification manager 256 has the responsibility to initiate and maintain connections to all notification producer nodes. The notification manager 256 is an application layer object which manages all notifications and interfaces with the server event subsystems 252.

Notification detector 203 exists within the user layer of PCM 201 and detects a notification condition or the abatement of a notification condition. In response, notification detector 203 sends a notification regarding the existence or abatement of the condition to a notification generator 204. The notification generator 204 is a user-layer object responsible for the creation of a notification packet. The notification generator 204 maintains an association with the notification distribution publisher 205 to facilitate transport of the notifications through to the notification client. Each notification packet is a unique (one-to-one) expression of the notification which caused it.

The notification packet is sent to the notification distribution publisher 205, which is the application layer service responsible for accepting notification packets from notification generator 204 and transporting them as bundled notification packages to notification distribution subscribers, such as notification distribution subscriber 257 in supervisory controller 120. Notification distribution is an application layer communication service whereby notification messages (described below) are transported from notification publishers to notification subscribers. The notification distribution layer provides the necessary robustness to ensure that notification packets are not lost and provides any necessary notification throttling.

A notification package comprises one or more notification packets grouped together by a notification distribution publisher into an application layer communication package for transmission to a notification distribution subscriber. In the example shown in FIG. 2, notification distribution subscriber 257 is the application layer endpoint for notification distribution publisher(s) 205. The notification distribution subscriber 257 establishes one application connection for each notification distribution publisher 205.

The notification packages are converted by a transport layer service 206 into notification messages suitable for transmission by the integrated control protocol and local area network 207. The notification message may be broken up into several "notification frames" (e.g., MAC packets) on the local area network 207. At the supervisory controller 120, the local area network 207 sends the notification frames to transport layer service 258, which renders the frames back into a notification message that is sent to the notification distribution subscriber 257. The notification messages are converted by the notification distribution subscriber 257 into notification packets for the notification manager 256.

The notification manager 256 is part of a control data access (CDA) server 255 and is responsible for sending notifications to the notification clients, which are the endpoint applications which ultimately use (consume) the notifications. Within supervisory controller 120, a server event subsystems 252 containing an event (or notification) journal 254 and an alarm acknowledgment status/alarm direction register 253 may be used by the notification manager 256 to separately store notifications (events) and alarms, respectively.

Notification recovery is needed by any notification client in order to synchronize the notification (event) database with that of the on-line system management. The client builds its alarm and event records based on what it recovers from PCM 201. In a normal system without failures (steady state), notification recovery does not occur. When there has been a disruption of the steady state, chiefly a node or network failure, notification recovery is used to synchronize a notification client to all notification generating nodes. A notification recovery from one notification distribution publisher 205 is simultaneously processed by all notification distribution subscriber(s) 257.

As stated previously, notification recovery may be initiated by certain scenarios that are detected by the notification manager 256: server startup, server failover, process controller startup, process controller failover, control network communication failure and recovery, addition (and configuration) of a new process controller, or notification client node startup. Notification recovery is initiated by PCM 201 in response to a command from notification manager 256.

According to one embodiment of the present invention, the notification distribution relationship may be a 1:n relationship between a notification consumer and a plurality of notification generators. In other embodiments of the present invention, the notification distribution relationship may be an n:1 relationship between a plurality of notification consumers and a notification generator. In still other embodiments of the present invention, the notification distribution relationship may be an n:m relationship between a plurality of notification consumers and a plurality of notification generators.

Notification recovery is triggered by any successful establishment of a transport layer connection in the network serving each notification-generating process controller. This covers all cases where notification is needed to handle equipment or network failure and recovery. When the network manager 256 detects the establishment, or re-establishment, as the case may be, of a network connection, the notification manager commands notification recovery from the process controller with whom the connection has been established or re-established.

In a server startup scenario, the notification client portion of the server subscribes to the notification manager 256. The notification manager (NM) 256 turns on when the node is powered up, but is quiescent until the client portion subscribes. The NM 256 then queries a system database to determine all currently configured notification producing nodes (process controllers 125a–f). Next, the NM 256 forms a notification transport connection with each notification distribution publisher in each process controller 125*a–f*, and, if successful, commands notification recovery from each. Notification recovery in this instance is a set of regenerated notifications bracketed by a start notification and an end notification, which allow the ultimate notification client to learn of the notification recovery. Advantageously, the ultimate notification client is not required to request a notification recovery.

A server failover is similar to a server startup in that a primary server fails over to a synchronized secondary server, which becomes the new primary server. The new primary server's notification client portion then subscribes to the notification manager 256. This causes the same sequence of operations described above, resulting in notification recovery being commanded from all process controllers 125*a–f*.

In a controller startup scenario, a new process controller 125 is powered up and configured on the network, but has not yet established a transport layer connection with the notification manager 256. The NM 256 maintains a list of all notification distribution publishers based on system configuration of the network. The NM 256 will therefore periodically attempt to form a notification transport layer connection with any notification distribution publisher that is configured by not yet connected. Once the transport layer connection is established with the new process controller 125, the NM 256 commands notification recovery from it. This operation does not affect other process controllers unless they also execute a start-up. The notification client is able to distinguish between a notification recovery from a particular process controller 125 as opposed to all process controller 125*a–f* because the notification recovery brackets, delimited by a start notification and an end notification, are transmitted on a per-process-controller basis.

A controller failover scenario is very similar to a controller startup scenario. When a primary process controller 125 fails over to a secondary process controller 125, the secondary process controller 125 become the new primary. However, the notification connection with the notification manager 256 is lost. When NM 256 performs a routine scan of the network based on the system configuration, the NM 256 detects the presence of the new primary process controller 125 and determines that it has the same address as the old primary process controller 125. Since the connection was lost and then recovered by the NM 256, the process controller 125 is ordered to perform a notification recovery by NM 256.

A controller failure and recovery scenario is very similar to a controller startup scenario. A process controller 125 fails and is repaired. When it is powered up again, the operations that follow are the same as for a controller startup scenario. As before, when the notification connection is lost due to the process controller 125 failure, the notification manager periodically monitors for the process controller 125 to come on line again.

In a network failure and recovery scenario, the notification connection is lost and the NM 256 attempts to reconnect any node on the (sub)network which failed. When the network is repaired and comes on-line again, the NM 256 reconnects to all affected process controller nodes and initiates separate notifications recoveries for each process controller node. Unaffected process controllers are not commanded to perform notification recoveries.

In an addition and configuration of a new process controller 125 scenario, a new process controller 125 is joined to the network and configured. The NM 256, which uses the system configuration to learn of all notification distribution publishers, periodically queries the system database for a complete list of all process controller nodes 125*a*. NM 256 then compares this list to the dynamic list of process controller nodes to which it has established notification connections and attempts to form a new connection to any new process controller node 125. If the connection is successfully formed, the NM 256 orders a notification recovery. If unsuccessful, the NM 256 periodically attempts to reconnect and order notification recovery.

In a notification client node startup scenario, all notification distribution publishers are commanded to perform a notification recovery in order to send all required notifications to the notification distribution subscriber in the client node. This contrasts with the startup of a notification producer node, in which only the notification producer node which is started is commanded to perform a notification recovery. When a notification producer node is started, synchronization is still maintained by the other notification producer nodes and they need not perform a notification recovery.

As can be seen from the foregoing descriptions, the start-ups of notification client nodes and notification producing nodes can occur in any order. The application layer compensates for the different start-up sequences by using notification recovery to synchronize the notifications clients as the notification information becomes available.

Figure 3A:
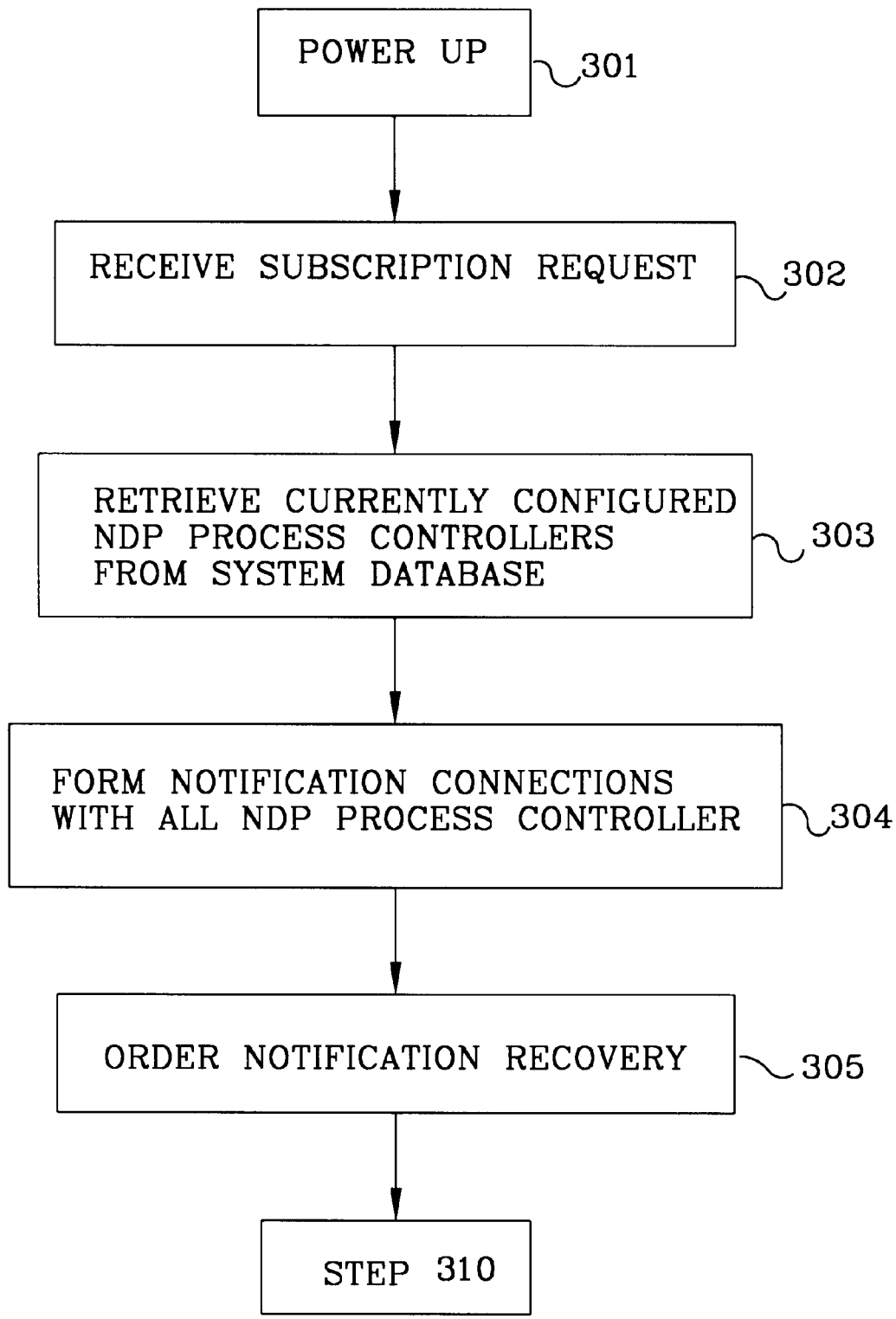
FIGS. 3A and 3B are flow diagrams illustrating the general operation of a notification manager according to one embodiment of the present invention.
Figure 3B:
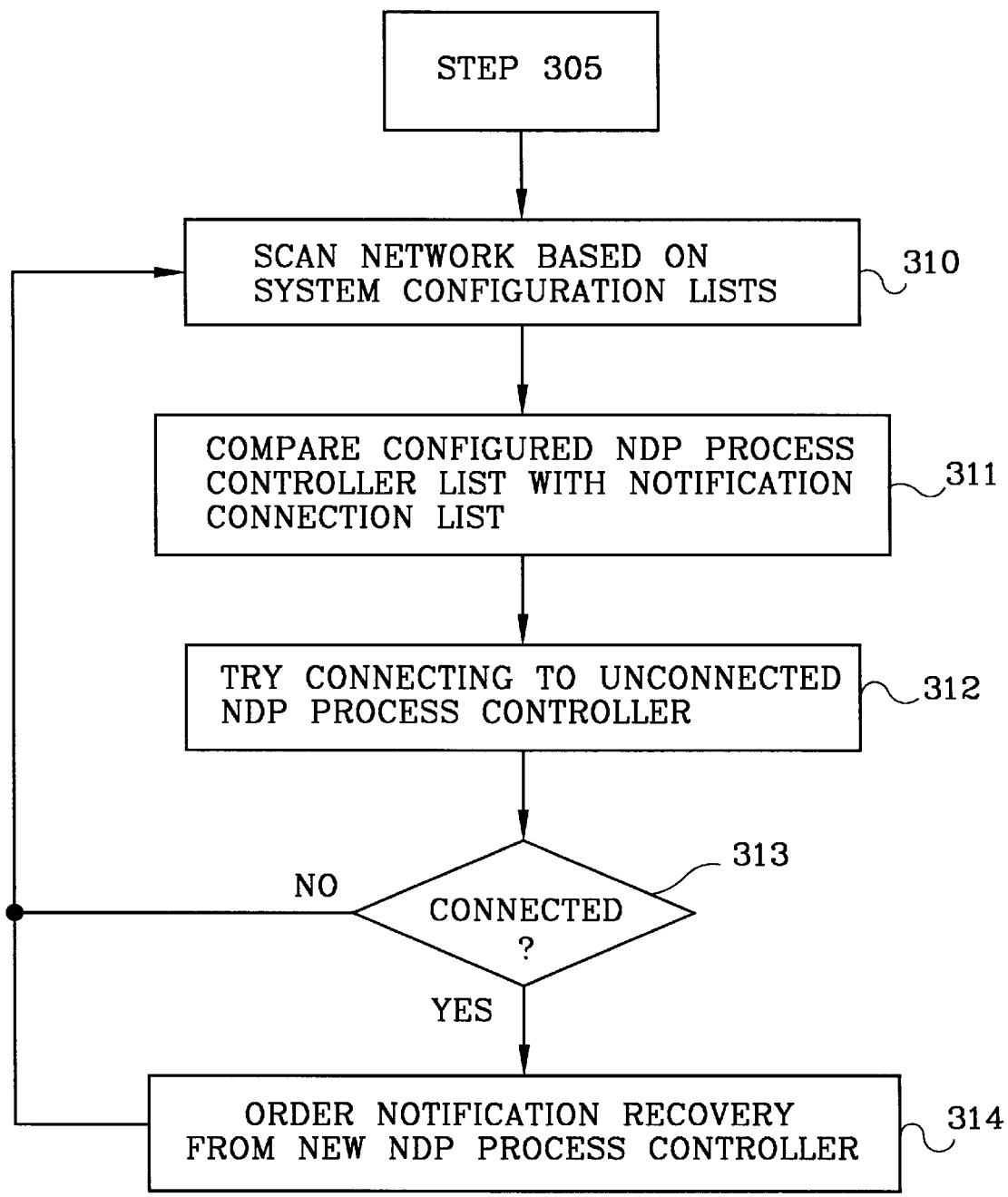

FIGS. 3A and 3B are flow diagrams illustrating the general operation of notification manager 256 according to one embodiment of the present invention. After power up (Step 301), the notification manager 256 remains in a quiescent state until a subscription request is received (Step 302) from the notification client portion of the server. In response, the notification manager 256 retrieves the list of currently configured notification distribution publishers (NDP) process controllers 125 from the system database (Step 303). Next, the notification manager 256 forms a notification connection with all of the NDP process controllers 125 (Step 304). As each notification connection is established, the notification manager 256 orders a notification recovery from the now-connected process controller (Step 305).

The notification manager 256 then enters a routine scanning mode, whereby notification manager 256 repetitively scans the system configuration list to determine all NDP process controllers 125 that are configured on the network (Step 310). Notification manager 256 compares the list of currently configured NDP process controllers 125*a–f* with its own list of process controllers 125 with which it has established notification connections (Step 311). After determining which configured NDP process controllers are not connected, notification manager 256 attempts to form a notification connection with the unconnected NDP process controllers 125 (Step 312). If a connection is established, notification manager 256 orders a notification recovery from the newly connected NDP process controller 125 (Steps 313 and 314). If a connection cannot be formed, notification manager 256 continues to scan the network configuration lists and thereby re-attempts from time-to-time to connect to any NDP process controller 125 with which notification manager 256 has not yet formed a transport layer distribution connection.

In on advantageous embodiment of the present invention, if notification distribution publisher 205 is performing a first notification recovery and second notification recovery is commanded by the same or a different notification distribution subscriber 257, the notification distribution publisher 205 may abort the first notification recovery and initiate the second notification recovery. The notification distribution subscriber(s) that are receiving the first notification recovery have the capability to recognize the start of the second notification recovery and synchronize to the second notification recovery instead.

This is also advantageous for a notification distribution publisher 205 operating in a multiple notification client environment. The notification distribution subscribers 257 may initiate multiple notification recoveries closely, but not simultaneously, in time. In such a case, the notification distribution publisher 205 repeatedly aborts the ongoing notification recovery when the next notification recovery is commanded, rather than sequentially starting and completing all notification recoveries. Only the last received notification recovery may be completed, thereby requiring only a minimum amount of time to perform the notification recoveries.

In on advantageous embodiment of the present invention, a notification client node can request a notification recovery on its own at any time using the same mechanism used by the application layer to perform automatic (background) notification recoveries. The application layer to which the notification client node subscribes provides a means by which the notification client node, or a surrogate acting on behalf of the notification client node, may enact the same mechanism used by the application layer to initiate a notification recovery.

The present invention is particularly advantageous in those instances where notifications are lost as a result of a large flood of notifications overwhelming the ability of a notification client to receive the notifications. Notification recovery is used when time permits to recover the lost notifications and synchronization is maintained. Because the notification recovery is handled automatically by the application layer, intervention is not required from either the notification client node or a human operator.

In on advantageous embodiment of the present invention, the notification client node can cause the application layer to "back-pressure" the notification producing nodes during a notification flood, thereby causing the notification producing nodes to hold information until the notification flood has abated or ended. Notification recovery can then be used to re-synchronize for any notifications lost during the notification flood.

Although the present invention and its advantages have been described in detail, those skilled in the art should understand that they can make various changes, substitutions and alterations herein without departing from the spirit and scope of the invention in its broadest form.

What is claimed is:

1. A control system for a process facility, comprising:
   distributed nodes associated by communication paths, wherein ones of said distributed nodes are associated with processes of said process facility; and
   notification controllers, associated with said distributed nodes, that sense reestablishment of lost ones of said communications paths from first distributed nodes to second distributed nodes and, in response thereto, communicate notification data from said second distributed nodes to said first distributed nodes.

2. The control system as set forth in claim 1 wherein said communication paths have data traffic capacities and said notification controllers efficiently utilize said data traffic capacities.

3. The control system as set forth in claim 1 wherein said notification controllers generate notification data concerning events and alarms associated with said second distributed nodes.

4. The control system as set forth in claim 3 wherein said notification controllers regenerate at least a portion of said notification data in response to sensing said reestablishment of said lost ones of said communications paths.

5. The control system as set forth in claim 1 wherein said distributed nodes include process nodes that control data associated with processes of said process facility and client nodes that desire said process data.

6. The control system as set forth in claim 1 wherein a certain second distributed node is a process node that controls data associated with one or more processes of said process facility and said a certain notification controller, associated with said certain distributed node, communicates notification data concerning at least one of events and alarms associated with said one or more processes.

7. The control system as set forth in claim 1 wherein said notification controller is further associated with at least one of a startup controller, a failover controller, a failure and recovery controller and a configuration and installation controller.

8. A method of operating a control system for a process facility, said control system including distributed nodes associated by communication paths, wherein ones of said distributed nodes are associated with processes of said process facility, said method comprising the steps of:
   sensing, with a notification controller, reestablishment of lost ones of said communications paths from first distributed nodes to second distributed nodes; and
   communicating, in response thereto, notification data from said second distributed nodes to said first distributed nodes.

9. The method as set forth in claim 8 wherein said communication paths have data traffic capacities and said method further comprises the step of efficiently utilizing said data traffic capacities with said notification controllers.

10. The method as forth in claim 8 further comprising the step of using said notification controllers generate notification data concerning events and alarms associated with said second distributed nodes.

11. The method as set forth in claim 10 further comprising the step of using said notification controller to regenerate at least a portion of said notification data in response to sensing said reestablishment of said lost ones of said communications paths.

12. The method as set forth in claim 8 wherein said distributed nodes include process nodes that control data associated with processes of said process facility and client nodes that desire said process data.

13. The method as set forth in claim 8 wherein a certain second distributed node is a process node that controls data associated with one or more processes of said process facility and said method further includes the step of using a certain notification controller, associated with said certain distributed node, to communicate notification data concerning at least one of events and alarms associated with said one or more processes.

14. The method as set forth in claim 8 wherein said notification controller is further associated with at least one of a startup controller, a failover controller, a failure and recovery controller and a configuration and installation controller.

15. A real time process control system for use to control a process facility, comprising:
   a plurality of sensors and controllable devices that are associated with processes of said process facility;
   communication paths associating said plurality of sensors and controllable devices with a computer system; and said computer system operates on data relating to said process facility and distributes said data among nodes thereof, said nodes associated by communication paths, said computer system further comprising notification controllers, associated with said nodes, that sense reestablishment of lost ones of said communications paths from first distributed nodes to second distributed nodes and, in response thereto, communicate notification data from said second distributed nodes to said first distributed nodes.

16. The real time process control system as set forth in claim 15 wherein said communication paths have data traffic capacities and said notification controllers efficiently utilize said data traffic capacities.

17. The real time process control system as set forth in claim 15 wherein said notification controllers generate notification data concerning events and alarms associated with said second distributed nodes.

18. The real time process control system as set forth in claim 17 wherein said notification controllers regenerate at least a portion of said notification data in response to sensing said reestablishment of said lost ones of said communications paths.

19. The real time process control system as set forth in claim 15 wherein said distributed nodes include process nodes that control data associated with processes of said process facility and client nodes that desire said process data.

20. The real time process control system as set forth in claim 15 wherein a certain second distributed node is a process node that controls data associated with one or more processes of said process facility and said a certain notification controller, associated with said certain distributed node, communicates notification data concerning at least one of events and alarms associated with said one or more processes.

21. The real time process control system as set forth in claim 15 wherein said notification controller is further associated with at least one of a startup controller, a failover controller, a failure and recovery controller and a configuration and installation controller.

* * * * *